(12) United States Patent (10) Patent No.: US 7,676,432 B2
Ling (45) Date of Patent: Mar. 9, 2010

(54) METHODS AND APPARATUS FOR TRANSACTING ELECTRONIC COMMERCE USING ACCOUNT HIERARCHY AND LOCKING OF ACCOUNTS

(75) Inventor: Marvin T. Ling, Scottsdale, AZ (US)

(73) Assignee: Paybyclick Corporation, Scottsdale, AZ (US)

( * ) Notice: Subject to any disclaimer, the term of this patent is extended or adjusted under 35 U.S.C. 154(b) by 555 days.

(21) Appl. No.: 10/616,124

(22) Filed: Jul. 8, 2003

(65) Prior Publication Data

US 2005/0010483 A1 Jan. 13, 2005

(51) Int. Cl.
*G06Q 30/00* (2006.01)
(52) U.S. Cl. .......................................... 705/39
(58) Field of Classification Search ................ 705/1, 705/38, 41, 35, 39–40, 44; 235/380; 709/203, 709/204, 224; 713/164–167; 707/9–10, 707/100–104; 726/1–7, 27–30
See application file for complete search history.

(56) References Cited

U.S. PATENT DOCUMENTS

| 4,802,218 | A |   | 1/1989  | Wright et al.   |        |
|-----------|---|---|---------|-----------------|--------|
| 4,816,824 | A |   | 3/1989  | Katz et al.     |        |
| 4,977,595 | A |   | 12/1990 | Ohta et al.     |        |
| 5,010,485 | A |   | 4/1991  | Bigari          |        |
| 5,224,162 | A |   | 6/1993  | Okamoto et al.  |        |
| 5,287,269 | A | * | 2/1994  | Dorrough et al. | 705/17 |
| 5,305,383 | A |   | 4/1994  | Guillou et al.  |        |
| 5,539,825 | A |   | 7/1996  | Akiyama et al.  |        |
| 5,655,023 | A |   | 8/1997  | Cordery et al.  |        |
| 5,671,364 | A |   | 9/1997  | Turk            |        |
| 5,815,657 | A |   | 9/1998  | Williams et al. |        |
| 5,826,243 | A | * | 10/1998 | Musmanno et al. | 705/35 |
| 5,832,089 | A |   | 11/1998 | Kravitz         |        |
| 5,839,119 | A |   | 11/1998 | Krsul et al.    |        |
| 5,845,260 | A | * | 12/1998 | Nakano et al.   | 705/26 |
| 5,850,442 | A |   | 12/1998 | Muftic          |        |
| 5,872,844 | A |   | 2/1999  | Yacobi          |        |
| 5,878,138 | A |   | 3/1999  | Yacobi          |        |
| 5,889,860 | A |   | 3/1999  | Eller et al.    |        |
| 5,897,622 | A |   | 4/1999  | Blinn et al.    |        |
| 5,899,980 | A |   | 5/1999  | Wilf et al.     |        |
| 5,900,564 | A |   | 5/1999  | Kurakake        |        |
| 5,920,861 | A |   | 7/1999  | Hall et al.     |        |
| 5,930,777 | A |   | 7/1999  | Barber          |        |
| 5,943,423 | A |   | 8/1999  | Muftic          |        |

(Continued)

FOREIGN PATENT DOCUMENTS

| CA |   2305233    | * | 4/2000 |
|----|--------------|---|--------|
| WO | WO 01/42946 A2 |   | 6/2001 |

OTHER PUBLICATIONS

Eisenoff, "Selecting Corporate Financial Planning Software", CPA Journal v61n9, pp. 89-93, 95, Sep. 1991.*

(Continued)

*Primary Examiner*—Mary Cheung

(57) ABSTRACT

Apparatus and methods are provided for facilitating electronic commerce in an environment in which a service provider handles business transactions between registered users and participating vendors and shipping companies, wherein users may establish and manage primary accounts and sub-accounts to purchase goods and services from participating vendors' web sites.

9 Claims, 9 Drawing Sheets

Account Structure

U.S. PATENT DOCUMENTS

| | | | |
|---|---|---|---|
| 5,943,424 | A | 8/1999 | Berger et al. |
| 5,963,924 | A | 10/1999 | Williams et al. |
| 5,966,699 | A | 10/1999 | Zandi |
| 5,982,891 | A | 11/1999 | Ginter et al. |
| 5,983,207 | A | 11/1999 | Turk et al. |
| 5,999,919 | A | 12/1999 | Jarecki et al. |
| 6,018,720 | A | 1/2000 | Fujimoto |
| 6,047,268 | A | 4/2000 | Bartoli et al. |
| 6,185,541 | B1 | 2/2001 | Scroggie et al. |
| 6,236,972 | B1 | 5/2001 | Shkedy |
| 6,236,981 | B1 | 5/2001 | Hill |
| 6,341,273 | B1 | 1/2002 | Briscoe |
| 6,385,596 | B1 | 5/2002 | Wider et al. |
| 6,449,601 | B1 | 9/2002 | Friedland et al. |
| 6,473,500 | B1 | 10/2002 | Risafi et al. |
| 6,473,740 | B2 * | 10/2002 | Cockrill et al. ............... 705/27 |
| 6,493,683 | B1 | 12/2002 | David et al. |
| 2001/0047310 | A1 * | 11/2001 | Russell ......................... 705/26 |
| 2003/0061157 | A1 * | 3/2003 | Hirka et al. ................... 705/39 |
| 2003/0080185 | A1 * | 5/2003 | Werther ...................... 235/380 |
| 2003/0097331 | A1 * | 5/2003 | Cohen ........................... 705/39 |
| 2003/0115137 | A1 * | 6/2003 | Rowe ............................ 705/39 |
| 2003/0119478 | A1 * | 6/2003 | Nagy et al. ................. 455/408 |
| 2004/0143527 | A1 * | 7/2004 | Benkert et al. ............... 705/35 |
| 2004/0162076 | A1 * | 8/2004 | Chowdry et al. ............ 455/445 |

OTHER PUBLICATIONS

"RocketCash-How"ItWorks-FAQs, RocketCash LLC, URL: http://www.rocketcash.com/howitworks/index.php?page=grequently_asked_questions, printed Mar. 1, 2002.

Lerner, Eric J., "Security Makes 'Net Gains," IBM Think Research, URL: http://domino.research.ibm.com/comm/wwwr_thinkresearch.nsf/pages/security196.html, printed Nov. 1, 2001.

"Qpass Commerce Solutions for Wireless Carriers," Qpass, Inc. URL: http://www.qpass.com/default.asp?pid=wirelesscarriersolution; http://www.qpass.com/default.asp?pid=products, an http://www.qpass.com/default.asp?pid=customerspartners, printed Oct. 17, 2001.

Pepe, Michele, "Start-Up Expands Payments Options," CRN Aug. 2000, URL: http://www.enition.com/press/content_3.htm, printed Oct. 17, 2001.

Tapscott, Don, "Giving a Lift to Micropayments," Computerworld, Dec. 2000, URL: http://www.computerworld.com/cwi/story/0,1199,NAV47-68-86-1721_STO55261,00.html, printed Oct. 17, 2001.

Boucher Ferguson, Renee, "Pay-as-you-go transactions," eWEEK Nov. 2000, URL: http://techupdate.zdnet.com/techupdate/stories/main/0,14179,2657472,00.00html, printed Oct. 17, 2001.

Tapscott, Don, "The Web doesn't have to shut out the 'small stuff" Computerworld, Inc. Nov. 2000, URL: http://www.computerworld.com/cwi/story/0,1199,NAV47-81_STO54155,00.html, printed Oct. 17, 2001.

Bedell, Doug, "Pay-per-click micropayments may become the norm on the Net," The Dallas Mornings News (Nov. 19, 2000) URL: http://www.dallasnews.com/technology/218421_micropayments_.html, printed Nov. 1, 2001.

"Clickshare: Connecting customers with content," Clickshare Service Corp. (Oct. 17, 2001) URL:http://www.clickshare.com/aboutus/, printed Oct. 17, 2001.

Huijskens, Jean-Marc, "cartio Micropayments Whitepaper," Net. Actuals B.V., May 2001.

"The Magex Solution FAQs," Magex Limited 2000, URL: http://www.magex.com/magexsolution/overview/faqs/asp. Printed Oct. 17, 2001.

Michael Peirce, "Payment mechanisms designed for the Internet," URL: http://ganges.cs.tcd.ie/mepeirce/Project/ointernet.html, printed Oct. 23, 2000.

"A plan for the introduction of internet cash," URL: http://www.jim.com/jamesd/kong/plan.htm, printed Oct. 20, 2000.

"Micropayment Methods," URL: http://www.transaction.net/payment/micro.html, printed Oct. 20, 2000.

Michael Peirce and Donal O'Mahony, "Scaleable, Secure Cash Payment for WWW Resources with the PayMe Protocol Set," URL: http://ganges.cs.tcd.ie/mepeirce/Project/Payme/Overview.html, printed Oct. 23, 2000.

"Internet Dollar is the money of the Internet," Internet Dollar LTD., URL: http://www.internetdollar.com, printed Oct. 20, 2000.

"What is eCoin micropayment system?" eCoin Incorporated, URL: http://www.ecoin.net, printed Oct. 20, 2000.

"Small change: Micropayment," Computerworld 2000, URL: http://www2.computerworld.com/home/features.nsf/All/980223micropaylinks, printed Oct. 23, 2000.

Network payment mechanisms & digital cash, URL: http://inf2.pira.co.uk/top033.htm, last updated Jul. 6, 2000, printed Oct. 20, 2000.

"Common markup for micropayment per-fee-links," WC3 Final Public Working Draft of Aug. 25, 1999, URL: http://www.,w3.org/TR/WD-Micropayment-Markup/, printed Oct. 16, 2001.

"Common markup for Ecash per-fee-links," Ecash.com adapted version of WC3 working draft of 25 Aug. 19, URL: http://www.ecash.com/MicroPayment/micropayment.htm, printed Sep. 28, 2001.

"Transmedia Europe, Inc. and . . . announce the acquisition on Silicon Valley Internet . . . ," PR Newswire, Jul. 16, 1998.

Bellare, M. et al, "Variety Cash: a Multi-purpose Electronic Payment System," Proc. Third Usenix Workshop on Electronic Commerce, Extended Abstract, Jun. 1998.

Neilsen, J., "The Case for Micropayments," useit.com (Alertbox Jan. 1998), URL: http://www.useit.com/alertbox/980125.html, printed Oct. 23, 2001.

"Wave Systems and IBM to Collaborate on Technology for Accessing Digital Content," Bus. Wire, Dec. 18, 1997.

Cohen, Warren, "Online malls move closer to home," U.S. News & World Report, vol. 123, No. 21, p. 86, Dec. 1, 1997.

Manasse, Mark, "The MilliCent Microcommerce System," Digital Systems Research Center Technical Presentation, Jul. 1977, URL: http://www.millicent.digital.com/works/details/presentations.html.

O'Mahony, D. et al., "Electronic Payment Systems," The Artech House Computer Science Library, Jun. 13, 1997.

Rafael Hirschfeld (Ed.). "FC '97 Papers," In Proceedings First Int'l Conference on Financial Cryptography, Feb. 1997, URL: http://www.arraydev.com/commerce/jibc/9704-30.htm.

Kosiur, Dave, "Buying Data bit by bit with Microcash: new technology lets Internet users pay as they go," PC Week, vol. 13, No. 34, Aug. 26, 1996.

"The MilliCent Protocols for Inexpensive Electronic Commerce," In Published Proc. First USENIX Workshop on Electronic Commerce, Jul. 1995, URL: http://www.millicent.digital.com/works/details/papers/millicent-w3c4/millicent.html, printed Oct. 25, 2001.

"The MilliCent Protocols for Electronic Commerce," In Published Proc. First USENIX Workshop on Electronic Commerce, Jul. 1995, URL: http://www.millicent.digital.com/works/details/papers/mcentny.htm, printed Oct. 25, 2001.

Neuman, B. et al., "Requirements for Network Payment: The NetCheque™ Perspective," In Proceedings of IEEE Compcon'95, San Francisco, U.S.A., Mar. 1995.

Medvinsky, Gennady, "NetCash: A design for practical electronic currency on the Internet," In Proceedings of the First ACM Conference on Computer and Communications Security, Nov. 1993.

"Payment mechanisms designed for the Internet," printed from the Internet at http://ganges.cs.tcd.ie/mepeirce/Project/oninternet.html, On Oct. 23, 2000.

"FC '97 Papers," Rafael Hirschfeld (Ed.), Feb. 1997, printed from the Internet at http://www.arraydev.com/commerce.jibc.9704-30.htm, on Oct. 20, 2000.

"Networked payment mechanisms & digital cash," printed from the Internet at http://inf2.pira.co.uk/top033.htm, on Oct. 20, 2000.

"Scaleable, Secure Cash Payment for WWW Resources with the PayMe Protocol Set," printed fro the Internet at http://ganges.cs.tcd.ie/mepeirce/Project/Payme/Overview.html on Oct. 23, 2000.

Rodriquez, Karen, "Toolkit Secures Internet Transactions," InfoWorld, col. 17, No. 8, p. 10, Feb. 20, 1995.

* cited by examiner

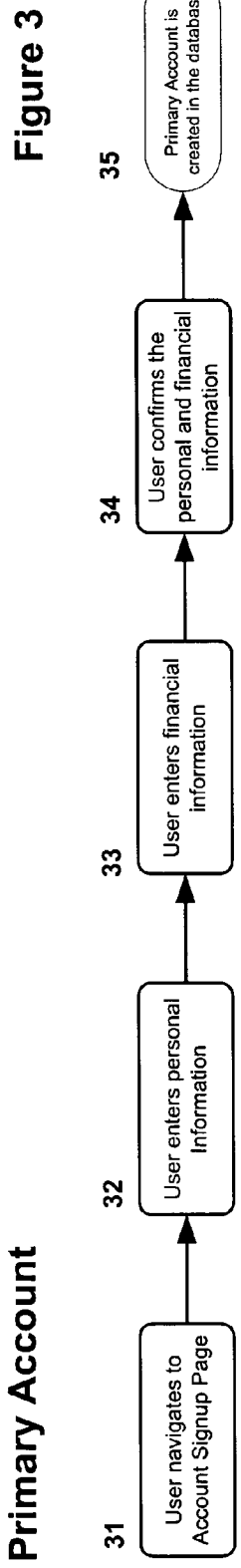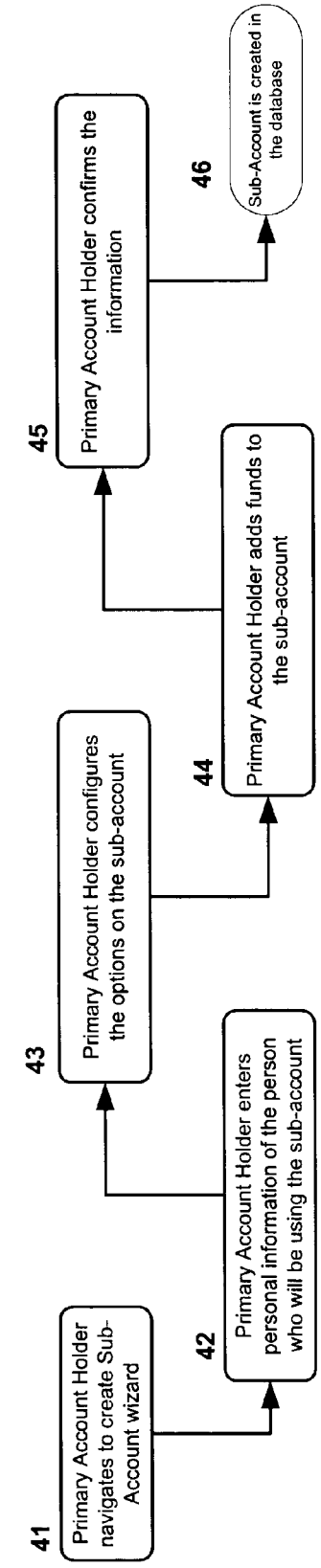

Configurable Options for Sub-Accounts

51 Assign a list of authorized vendors: Primary account holder can limit the activities of sub-accounts by allowing them to buy only from a selected list of approved vendors.

52 Spending Thresholds: Primary account holder can set the spending thresholds of the sub-account. The thresholds can be sent on a per transaction basis, or per day, per week or per month basis.

53 Create Sub-Accounts: Primary account holder can authorize a sub-account user to create sub-accounts underneath it. If authorized, then a sub-account user can create and manage its own set of sub-accounts.

54 Ability to Add Funds: Primary account holder can authorize a sub-account user to add funds independently. If authorized to do so, sub-account user does not have to request the primary account holder to add funds to the sub-account. The user of the sub-account may add funds using a credit card, debit card, bank transfer, cash or any other method of payment allowed by the service provider.

55 Modify Spending Thresholds: Primary account holder can authorize a sub-account user to modify the sub-account's spending thresholds.

56 Modify Secured Information: Primary account holder can authorize a sub-account user to modify the sub-account's secured information that may include e-mail address, password and security answer.

57 Automatically Draw funds from the parent account: Primary account holder can authorize a sub-account to automatically draw funds from the primary account. If authorized to do so, the service provider computer will automatically transfer funds from the primary account to the sub-account during a transaction process.

Figure 5

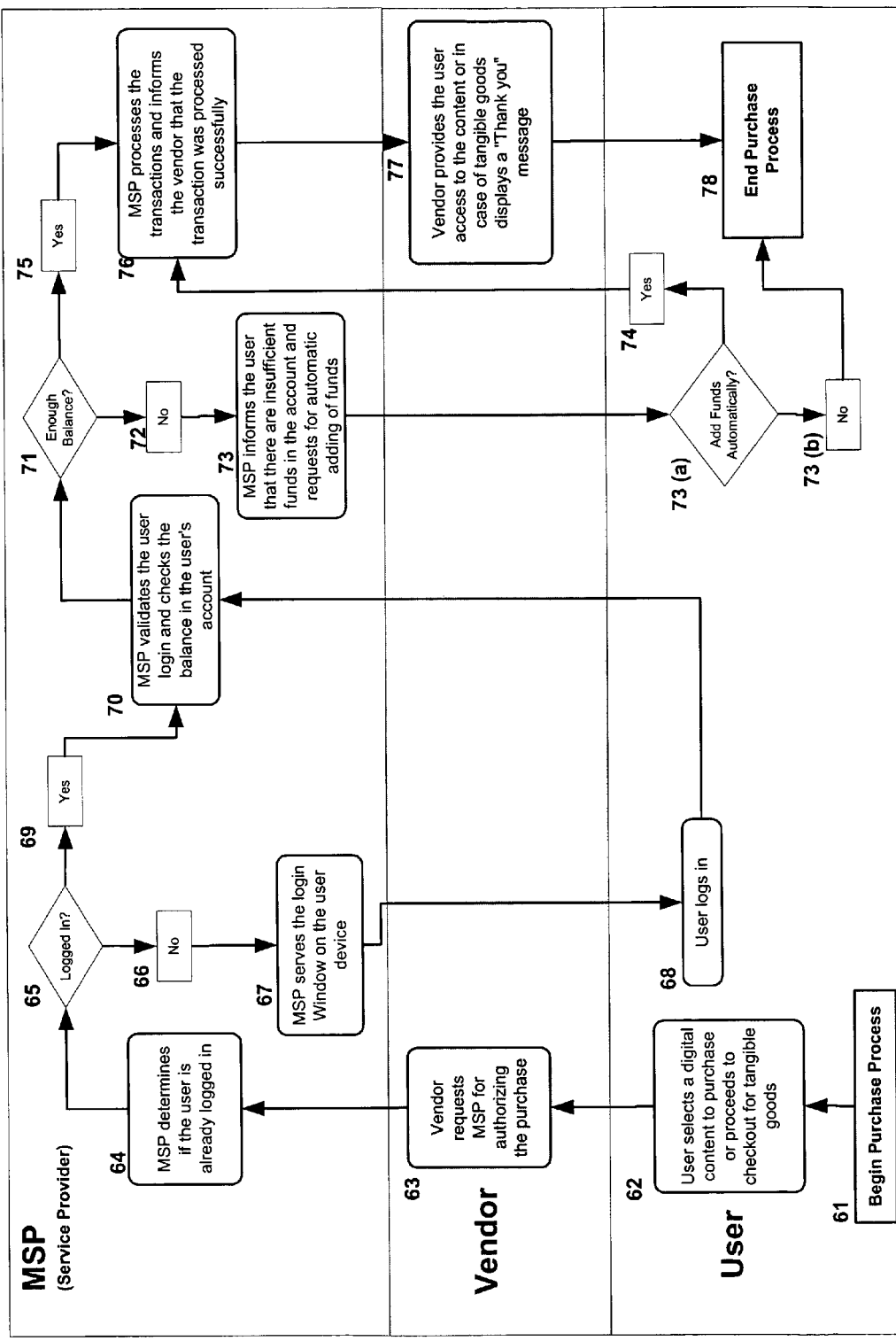

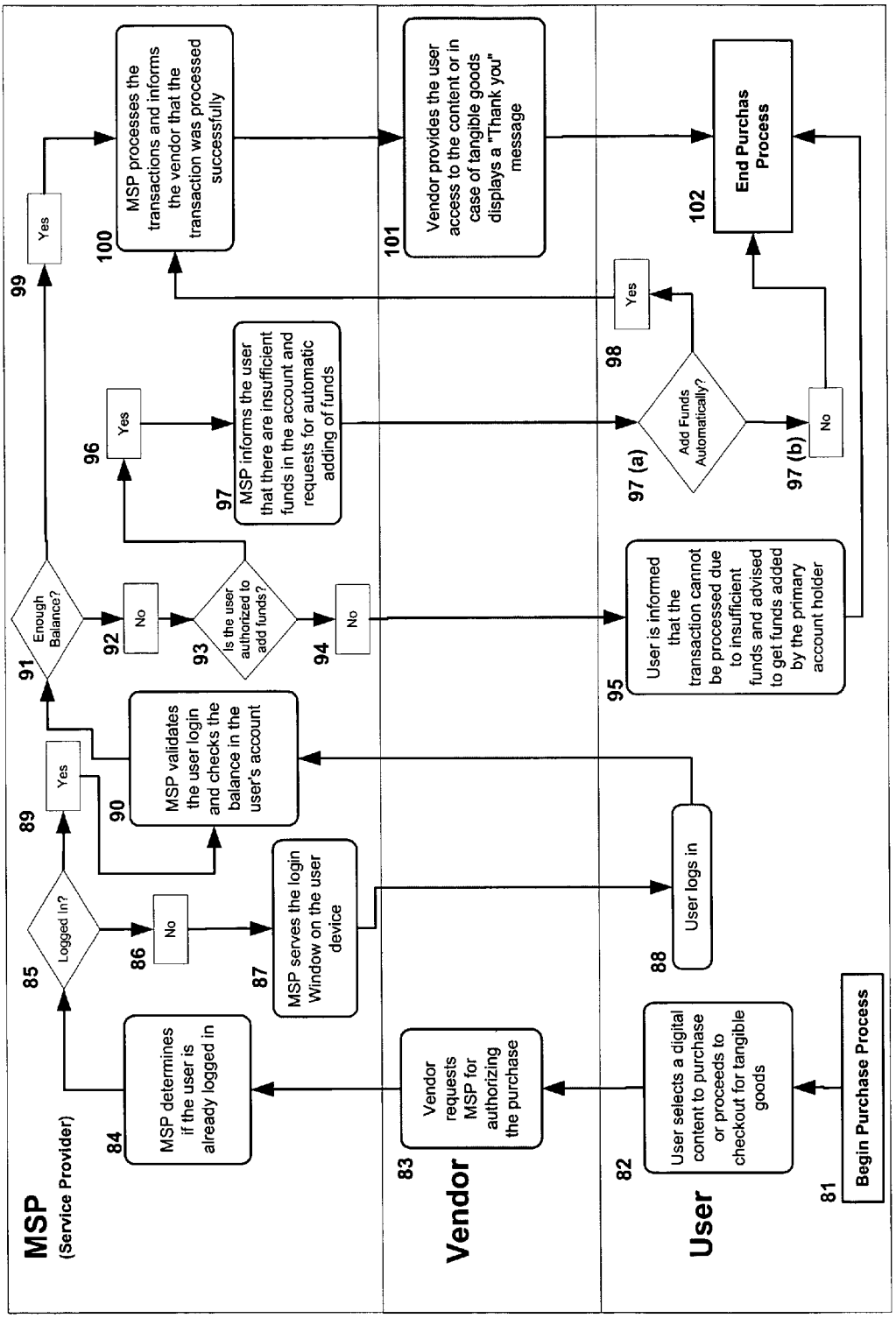

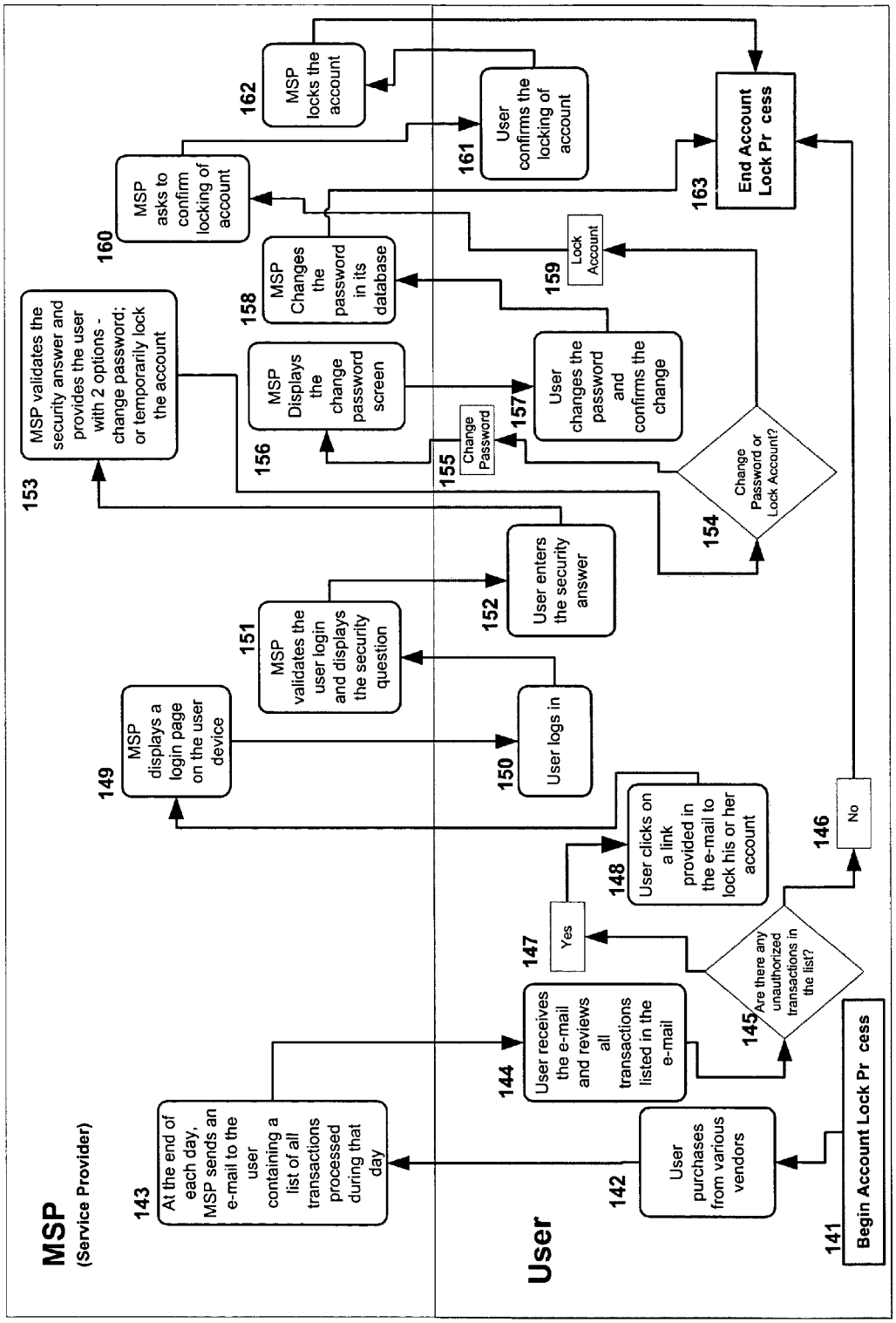

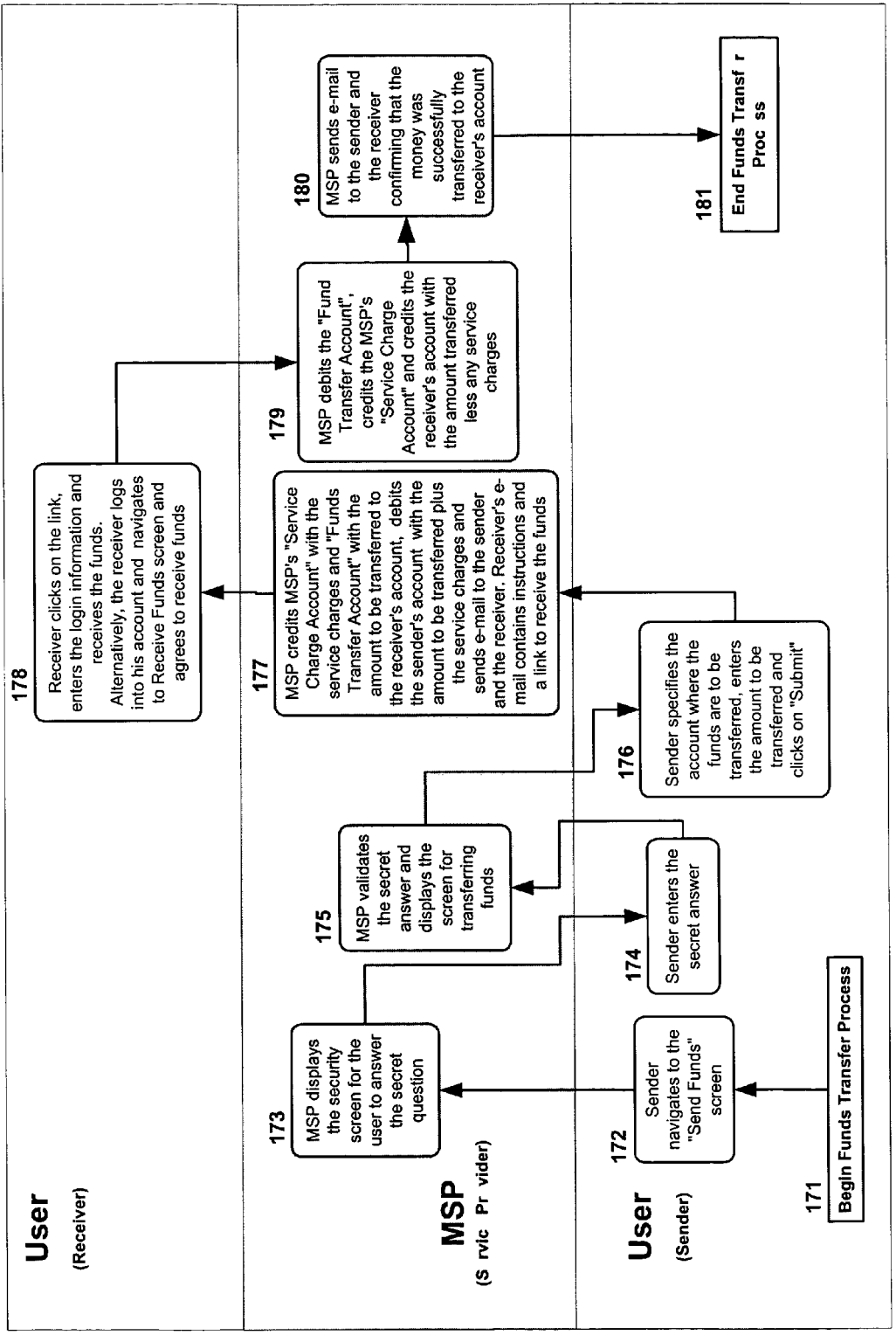

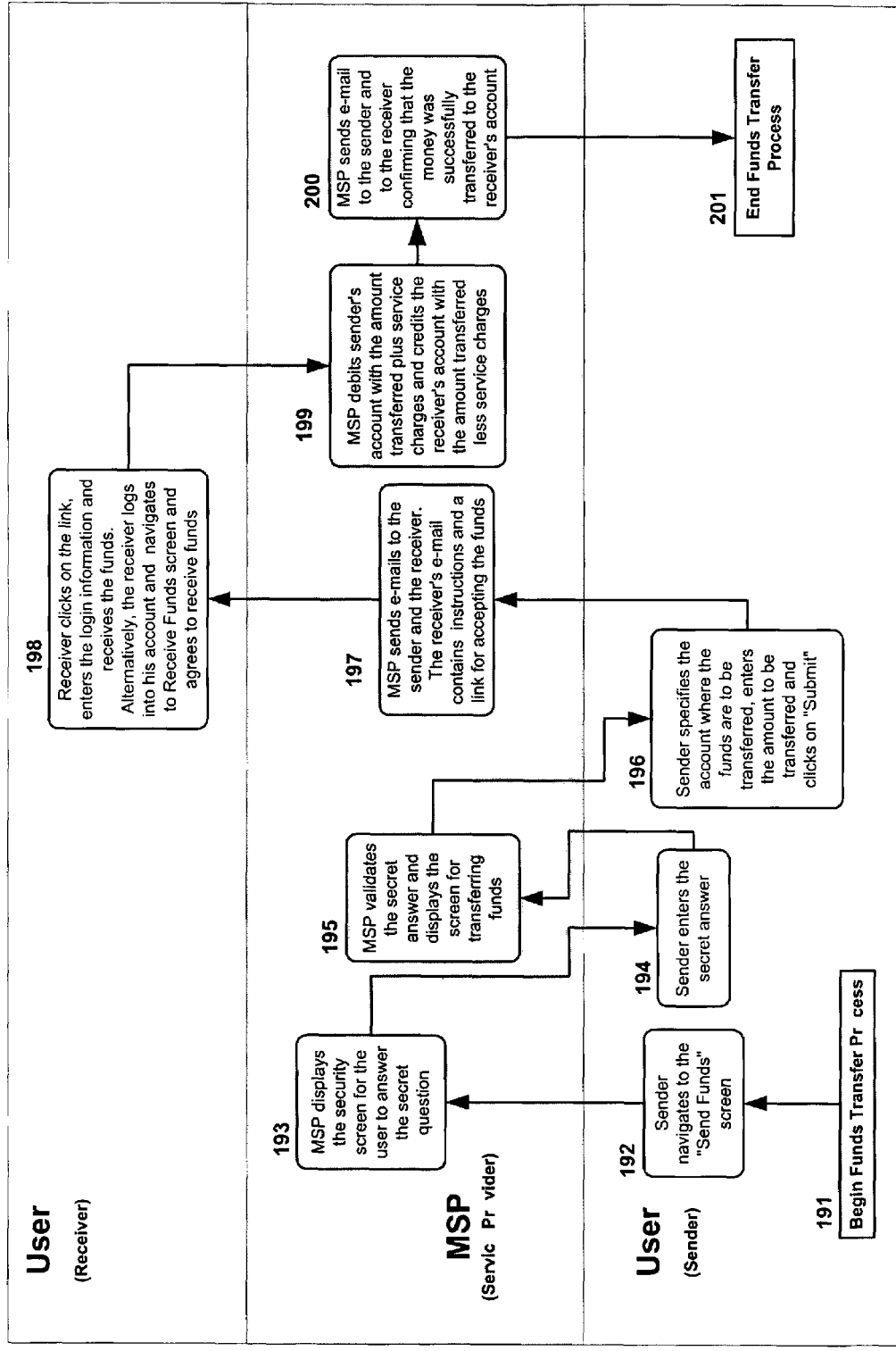
Figure 10 — Transferring of Funds Between Accounts Process - 2

METHODS AND APPARATUS FOR TRANSACTING ELECTRONIC COMMERCE USING ACCOUNT HIERARCHY AND LOCKING OF ACCOUNTS

FIELD OF THE INVENTION

This application relates to apparatus and methods for facilitating electronic commerce by enabling a user to create and maintain sub-accounts, to be able to lock his or her account if it is suspected that the account is being misused, and to transfer and receive money from other users.

BACKGROUND OF THE INVENTION

On-line vendors sell a variety of products over the Internet. Users may browse a vendor's website and may purchase products directly from the vendor. Typically the user sets up an account with the vendor, and the vendor will provide some arrangement for accounting for purchases from the vendor's website either on a transaction or periodic basis.

For example, where the user is a member of a company department, it typically will be necessary for the user (in this case a department administrator) to set up an individual account for each authorized employee. A drawback of such an arrangement is that the transaction reports for each authorized user must be separately reviewed, and the department administrator cannot detect improper activity until the end of the billing cycle, and perhaps not even then.

In addition, there is the potential for disgruntled employees or even third-parties to steal the identity of authorized personnel, and incur improper charges or fraudulently obtain goods or services through an authorized individual's account. Presently, there is no method for a department administrator to detect such activity until the end of the billing cycle, when the improper charges might be detected, for example, during review of a monthly statement. In the interim, however, sizable improper charges may be incurred or goods stolen without possibility of recovery.

A similar situation arises where a user might want to set up an account with one or more vendors' website for a spouse or child. Specifically, the user may want to retain oversight of the spouse's or child's expenditures and the specific vendors at which purchases are made. It would also be desirable in this case for the user to be able to review purchases made by the spouse or child on a frequent basis to ensure that security for that account has not been compromised.

In view of the foregoing drawbacks of previously known on-line electronic commerce arrangements, it would be desirable to develop methods and apparatus whereby a user may create a primary account having multiple sub-accounts. The user may specify the features for each of the sub-accounts, including, for example, where purchases may be made, a spending limit per transaction or item, a notification threshold and reporting period.

An example of such a system in a family context would enable a parent to open a primary account with a service provider and then create sub-accounts for each child. In this manner the children could make purchases over the Internet at only those websites that are approved by the parent. The parent also could control the spending limits of the children's sub-accounts, receive a periodic notification of sub-account activity or a transaction-specific notification if a proposed purchase exceeds some threshold amount preset by the parent, and retain control in adding funds to the account.

In a business environment, a department administrator or company controller could open a primary account and then create sub-accounts for each authorized employee or department. The primary account holder then could control spending of the sub-accounts, control which websites are approved for sub-account purchases, receive periodic or transaction-specific notification of sub-account activity, and retain control to add additional funds to the account.

It therefore would be desirable to provide apparatus and methods for facilitating electronic commerce by enabling a user to set up a primary account with a service provider, wherein the service provider can handle transactions with a variety of vendors, and wherein the main account can create and exercise control over a plurality of sub-accounts.

It further would be desirable to provide apparatus and methods for facilitating electronic commerce that provide secure method financial transactions over the Internet or any other communication channel. It also would be desirable to provide apparatus and methods for facilitating electronic commerce that provide enhanced security by, periodically or on a transaction-specific basis, sending an E-mail or other notification to the primary account holder summarizing all transactions within the period. Alternatively, the primary account holder may set a notification threshold, so a transaction-specific notification is sent only when the purchase amount exceeds some preset limit.

It yet further would be desirable to provide apparatus and methods for wherein a security notification sent to the primary account holder could include a link that could be activated by the recipient to lock or freeze the sub-account associated with the notification. In this manner, if the primary account holder notices that a transaction was not authorized, the primary account holder may activate the link received in the notification to freeze the account, thereby preventing any further misuse. For example, a sub-account could be frozen by changing the password or by authorizing the service provider computer to temporarily lock the sub-account, subject to investigation.

It also would be desirable to provide apparatus and methods for facilitating electronic commerce that enable the primary account holder to transfer or receive money from other users of the system. For example, in an auction environment where both the buyer and the seller are authorized users of the system, the buyer who has successfully won a bid may want to transfer funds to the seller using the system in a secure and cost effective environment.

SUMMARY OF THE INVENTION

In view of the foregoing, it is an object of the present invention to provide methods and apparatus for facilitating electronic commerce that allow a user to create a primary account and one or many sub-accounts under the primary account.

It is another object of this invention to provide apparatus and methods for facilitating electronic commerce that provide enhanced security by, periodically or on a transaction-specific basis, sending an E-mail or other notification to the primary account holder summarizing all transactions within the period or transaction. Optionally, the primary account holder may set a notification threshold, so a transaction-specific notification is sent only when the purchase amount exceeds some preset limit.

It is yet another object of the present invention to provide apparatus and methods for wherein a security notification sent to the primary account holder could include a link that could be activated by the recipient to lock or freeze the sub-account associated with the notification. In this manner, if the primary account holder notices that a transaction was not authorized, the primary account holder may activate the link received in the notification to freeze the account, thereby preventing any further misuse.

It is also an object of this invention to provide apparatus and methods for facilitating electronic commerce that enable the primary account holder to transfer or receive money from other users of the system, such as in an auction environment.

These and other objects of the invention are accomplished in accordance with the principles of the invention by providing methods and apparatus that enable a user to create with a service provider a primary account having a plurality of sub-accounts and to administer or manage these sub-accounts. The service provider handles electronic commerce transactions between the primary/sub-accounts and a variety of vendor websites at which the primary/sub-accounts are authorized to do business. The primary account holder may specify the features for each of the sub-accounts, including, for example, where purchases may be made, a spending limit per transaction or item, a notification threshold and reporting period.

A service provider computer of the service provider maintains database information on the primary account and its relationships with the sub-accounts. Preferably, the service provider computer maintains database information on the users of the primary account and sub-accounts, including, for example, the user's personal information, login information, password, financial information, street address and shipping address. The service provider computer also maintains database information on participating vendors, which include, among other information, vendor account information, vendor contact and address.

The service provider computer maintains security restrictions imposed by the primary account holder on sub-accounts. More specifically, the service provider computer is programmed to maintain database information on the primary account and the sub-accounts, and for each sub-account it maintains a list of participating vendors where the sub-accounts are authorized to make purchases. The service provider computer records and maintains purchase transactions, debits the user account (primary or sub-accounts) with sales price and shipping cost, credits the vendor account with sales price less any service charge due to the service provider, and also may credit a participating shipping company's account for any shipping cost less any service charge due to the service provider.

The service provider computer also provides an interface for the primary account holder to create and administer the sub-accounts, to add funds to the sub-accounts, manage spending thresholds for sub-accounts, manage secured information of sub-accounts, configure periodic or transaction-specific notification features and/or thresholds, selectively lock one or more sub-accounts to prevent misuse, and print a report that consolidates activities of the primary account and all corresponding sub-accounts.

The service provider computer also provides an interface for sub-account holders to log into and manage their accounts. If so configured by the primary account holder, a sub-account holder may create a sub-account underneath it. If such a sub-account is created, the new sub-account preferably inherits all of the features and limitations of its parent, but may in addition include further limitations imposed by the holder of the parent sub-account.

The service provider computer also may provide an interface that enables users to transfer and receive funds from other accounts. In this case, the service provider computer may be programmed to debit an account from which funds are withdrawn and to credit another account that is to receive the funds. The service provider computer also may levy a service charge on the sender, the receiver or on both sender and receiver, for handling such transactions.

BRIEF DESCRIPTION OF THE DRAWINGS

Additional features of the invention, its nature and various advantages will be more apparent from the accompanying drawings and the following detailed description of the preferred embodiments, in which:

FIG. 3 is a flow chart illustrating the steps involved in creating a primary user account;

FIG. 4 is a flow chart illustrating the steps involved in creating a sub-account;

FIG. 5 is a listing of configurable options that may be available to a primary account holder for creating a sub-account in accordance with the present invention;

FIG. 6 is a flow chart illustrating the steps involved when a primary account holder makes a purchase from a participating vendor;

FIG. 7 is a flow chart illustrating the steps involved when a sub-account holder makes a purchase from an authorized vendors;

FIG. 8 is a flow chart illustrating the steps involved when a primary account holder locks or freezes an account in accordance with the present invention;

FIG. 9 is a flow chart illustrating the steps involved when funds are transferred from one account to another separate account; and FIG. 10 is a flow chart illustrating an alternative method of transferring funds from one account to another separate account.

DETAILED DESCRIPTION OF THE PREFERRED EMBODIMENTS

Figure 1:
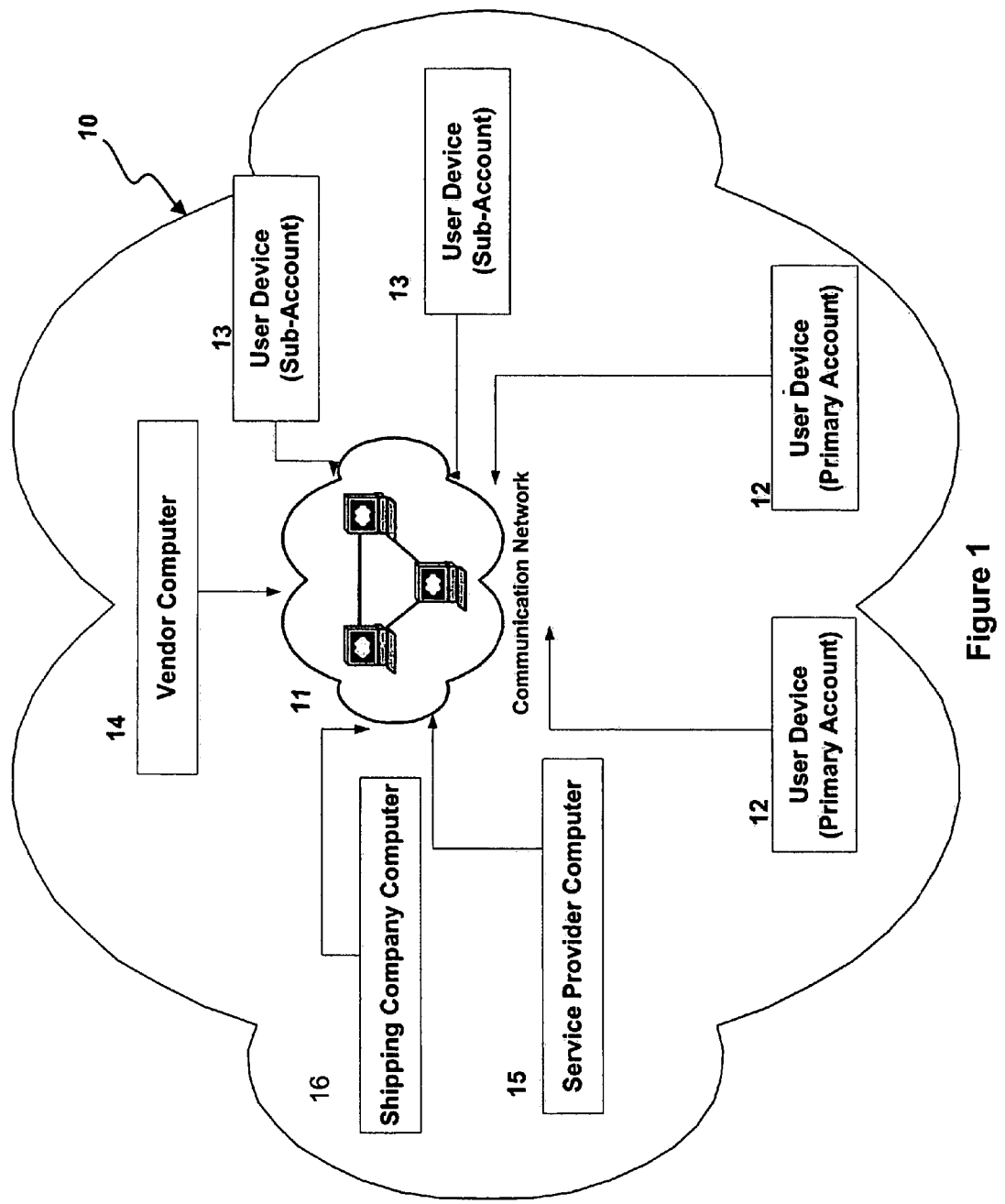
FIG. 1 is a schematic diagram of illustrative apparatus depicting the entities involved in conducting transactions in accordance with the present invention.

Referring to FIG. 1, illustrative system 10 for facilitating electronic commerce in accordance with the principles of the present invention is described. System 10 comprises a network, e.g., the Internet, that enables communication between primary account user devices 12, sub-account user devices 13, one or more vendor computers 14, one or more shipping company computers 16 and service provider computer 15. Primary account user devices 12 and sub-account user devices 13 may be conventional personal computers or Internet appliances.

Communications network 11 by which the various entities 12-16 in system 10 communicate may be based on the Internet, local area networks, wide area networks, private networks, or any other suitable networks that support communications between different parties located at respective computers or other suitable electronic devices.

In accordance with the present invention, service provider computer 15 is programmed to enable a registered user to create a primary account, and to handle business transactions between the user of the primary account and one or more participating vendor computers 14. The holder of the primary account further may create and administer sub-accounts that enable users of sub-account user devices 13 to make purchases at participating vendors' websites as authorized by the primary account holder.

Account holders use user devices 12 and 13 to browse for products at vendor web sites on vendor computers 14 over communications network 11. User devices 12 and 13 may be desktop or notebook personal computers, personal digital assistants, wireless telephones, or any other suitable user devices. Product offerings on vendor computers 14 may be provided in the form of web pages organized into web sites. Internet web browsers on user devices 12 and 13 may be used to allow users to browse the web content on vendor computers 14.

Vendors at vendor computers 14 may sell any of a variety of goods or services. For example, one vendor 14 may sell intangible products such as electronically downloadable video or songs. Another vendor 14 may sell tangible products such as compact discs to be delivered by mail or other courier service. Other vendors may sell shoes, clothing or books.

Service providers associated with service provider computers 15 facilitate transactions by maintaining transaction records, databases reflecting registered users of primary accounts and sub-accounts, and participating vendors and shipping companies; and by settling accounts with the vendors and shipping companies for goods or services purchased by users via user devices 12 and 13. To participate in the system, vendors, shipping companies and users all must be registered with service provider computer 15.

Figure 2:
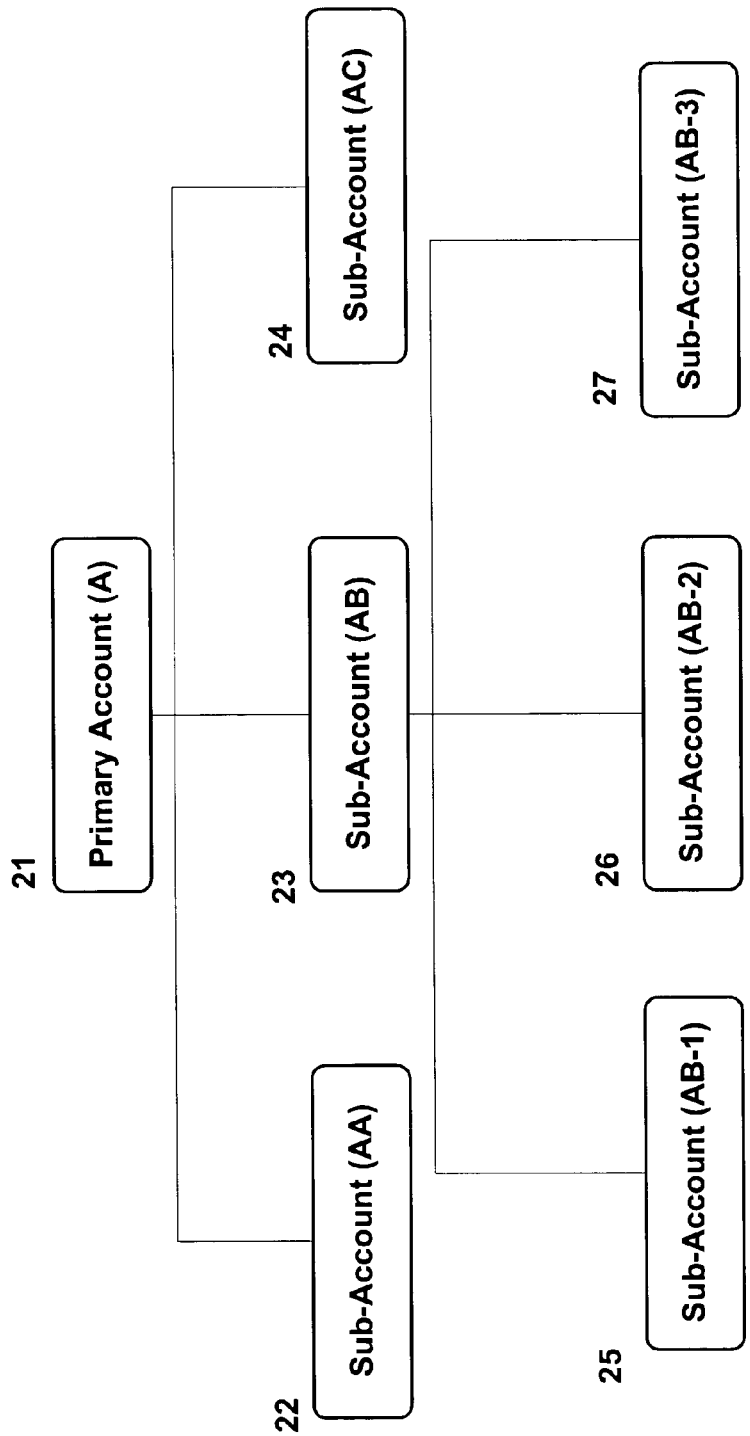
FIG. 2 is a diagram of an illustrative account hierarchy created in accordance with the principles of the present invention.

Referring now to FIG. 2, the hierarchical nature of the relationships between a primary account and its sub-accounts is described. A user, who has initially opened an account with service provider computer 15, may desire to open a sub-account to individually and separately manage and track purchases and activities of each sub-account. The user of primary account 21 has opened three sub-accounts 22-24, wherein sub-account 23 has three additional sub-accounts 25-27 associated with that account.

In a business environment, primary account 21 may represent a company, while sub-accounts 22-24 may represent departments within the company and sub-accounts 25-27 may represent individual employees of a department. In a family context, primary account 21 may represent a parent while sub-accounts 22-24 may be intended for use by other family members, such as children.

With respect to FIG. 3, an illustrative method of using system 10 to create a user account with service provider computer 15 are described. At step 31 a user navigates to a signup page at the service provider computer 15. At steps 32 and 33, the user enters personal and financial information respectively. At step 34 the user confirms the information. At step 35 the user's account is created at service provider computer 15.

Referring now to FIG. 4, an illustrative method of using system 10 to create a user sub-account at service provider computer 15 are described. At step 41, a primary account holder (or sub-account holder authorized to create sub-accounts) navigates to the website of service provider computer 15 and selects the link to create a sub-account. This link is not available to the user of the sub-account if that sub-account is not authorized to create another level of sub-accounts.

After selecting the link, at step 42, the user enters the personal information of the user who will be assigned to the sub-account, and at step 43, selects the configuration options for the sub-account. At step 44, the user adds funds to the sub-account. At step 45 the user confirms the information entered to set up the sub-account. At step 46 service provider computer 15 creates a sub-account database maintained by service provider computer 15.

With respect to FIG. 5, some of the configuration options available to a primary account user or authorized sub-account user are described. These options enable the user creating the sub-account to separately configure each sub-account to meet the specific requirements of the user.

Block 51 of FIG. 5 permits a user to configure a sub-account so that the sub-account may be used only to purchase goods or services from a limited number of vendors who have been approved by the user. In one embodiment, the approved vendor list of a sub-account defaults to a list including all vendor computers 14 that are registered with service provider computer 15. However, the primary account holder may configure individual sub-accounts so that those accounts may be used to make purchases only from a subset of all registered vendors. Alternatively, the primary account holder may configure individual sub-accounts so that those accounts may be used to make purchases from all vendor computers 14 that are registered with service computer 15, except for a predefined subset of the registered vendors.

The foregoing feature advantageously may be used in both business and private environments. In the business environment, a sub-account for a particular department may be configured to make purchases only from a list of authorized vendors. For a family account, a parent may wish to limit the purchasing options of his or her spouse or children and limit a sub-account to purchase only from an approved list of vendors.

With respect to block 52, the primary account holder may set spending thresholds or limits for each sub-account. In a preferred embodiment, no spending limit is assigned when a sub-account is created. However, the user creating a sub-account may set a spending limit for the sub-account, whereby a user of a sub-accounts will be unable to make purchases once the sub-account spending limit is reached. A spending limit may be set on a per-transaction basis or periodic basis, e.g., per day, week or month basis.

As described in block 53 of FIG. 5, a primary account holder also may authorize the sub-account users to create a third level of sub-accounts, such as sub-accounts 25-27 in FIG. 2. In a preferred embodiment, the default condition is that a sub-account user cannot create additional sub-accounts. However, the primary account holder may override this default and configure specific sub-accounts to create an additional level of sub-accounts.

Block 54 of FIG. 5 illustrates that a primary account holder may configure a sub-account so as to allow sub-account users to add funds independently of the primary account. If allowed to do this, a sub-account user may add funds in any one or more of multiple ways including authorizing a transfer from the primary account, using credit cards, debit cards, bank transfer or cash. In a preferred embodiment, the default condition is that a sub-account cannot add funds to that account independently of the primary account.

Referring now to block 55 of FIG. 5, the primary account holder may configure a sub-account to enable that sub-account to change its spending thresholds. In a preferred embodiment, this feature defaults to prohibiting sub-account users from changing the spending thresholds for the sub-account. As with the foregoing features, the primary account holder may override this default.

With respect to block 56 of FIG. 5, the primary account user may configure the sub-accounts so as to allow sub-accounts users to modify the secured information associated with the account. Such information may include, for example, the sub-account users' E-mail address, password and security answer. In a preferred embodiment, the default for this feature is that a sub-account user may change the secured information. However, the primary account user may override this default and prohibit a sub-account from changing such secured information.

As shown in block 57 of FIG. 5, the primary account user also may configure the sub-accounts so that the funds are automatically added to the sub-account via a transfer from the primary account to the sub-account. In accordance with this aspect of the present invention, service provider computer 15 is programmed to automatically transfer funds to a sub-account from the primary account if the sub-account's balance falls below zero or a preset minimum amount during a transaction. If a sub-account is so configured, service provider computer 15 will do so during the purchase transaction. Otherwise, service provider computer 15 will generate and display a message on sub-account user device 13 that there are insufficient funds in the account and instruct the sub-account user to request the primary account user to add funds to the sub-account before that purchase transaction can be processed.

Referring now to FIG. 6, a method of using system 10 to facilitate a purchase transaction using a primary account is described. Step 61 represents the beginning of a purchase transaction. At step 62, a user using user device 12 has selected digital content or tangible goods for purchase and is ready to checkout. At step 63, vendor computer 14 requests service provider ("MSP" at 63, 64, 67, 70, 73, and 76) computer 15 to authorize the purchase.

Upon receiving the request from vendor computer 14, service provider computer 15, at steps 64 and 65, determines if the user is already logged-in to his or her account on service provider computer 15. If the user is not already logged in (step 66), service provider computer 15, at step 67, displays the login page to user device 12. At step 68, the user logs in. At step 70, service provider computer first validates the login information provided by the user and then checks the user account to make sure that there are sufficient funds in the account to process the transaction. If the user has already logged in (step 69) then steps 67 and 68 are omitted.

Upon checking the user's balance (step 71), the user may have sufficient funds (step 75), but if there are insufficient funds in the user's account to process the transaction step 72, then, at step 73, service provider computer 15 so informs the user and requests that funds be added to the account (step 73(*a*)). The user may either approve automatic adding of funds, e.g., by charging a credit card or debit card, or the user may cancel the transaction (step 73(*b*)) and manually add funds at a later time. At step 74, the user confirms the automatic addition of funds.

At step 76, service provider computer 15 processes the transaction by debiting the user account and crediting the vendor account. The service provider computer 15 then informs the vendor that the transaction has been processed successfully. Steps 73 and 74 are omitted if the user had enough funds to pay for the transaction.

When vendor computer 14 receives confirmation of a successful transaction from service provider computer 15, the vendor, at step 77, provides the user access to the content or in case of tangible goods, displays a "thank you" message to the user and continues to process the shipping of tangible goods. Step 78 marks the end of the purchase process.

With respect to FIG. 7, an illustrative method of using system 10 to facilitate a purchase transaction using a sub-account is described. Except as noted hereinafter, the buying experience of the sub-account user is very similar to that of the primary account user described with respect to FIG. 6.

Step 81 represents the beginning of a purchase transaction. At step 82, the user has selected digital content or tangible goods and is ready to checkout. Vendor computer 14, at step 83, requests service provider computer 15 to authorize the purchase.

Upon receiving the request from the vendor, service provider computer 15, at steps 84 and 85, determines if the user is already logged in. If the user is not logged in (step 86), service provider computer 15, at step 87, generates and displays the login page to the user on user device 13. At step 88, the user logs in and at step 90, service provider computer 15 first validates the login information provided by the user and then checks the user account to make sure that there are sufficient funds in the account to process the transaction (step 91). If the user has already logged in at step 89, then steps 87 and 88 are omitted.

If the user's sub-account has insufficient funds to process the transaction (step 92), then at step 93, service provider computer 15 checks if the sub-account user is authorized to add funds. If the user is not authorized to add funds, step 94, then service provider computer 15, at step 95, informs the user that the transaction cannot be processed due to insufficient funds and advises the user to request the primary account user to add funds to the sub-account.

If the sub-account user is authorized to add funds (step 96), then at step 97 service provider computer 15 informs the user that there are insufficient funds and requests that funds be automatically added to the account (step 97(*a*)). The user may either approve the automatic addition of funds or cancel the transaction (step 97(*b*)) and manually add funds at a later time. At step 98, the user confirms automatic addition of funds. Service provider computer 15, at step 100, processes the transaction by debiting the user account and crediting the vendor account. Service provider computer 15 then informs the vendor that the transaction has been processed successfully. Steps 97 and 98 are omitted if the sub-account is determined to have enough funds to pay for the transaction (step 99).

When vendor computer 14 receives confirmation of a successful transaction from service provider computer 15, the vendor, at step 101, provides the user access to the content or in case of tangible goods, displays a "thank you" message to the user and continues to process the shipping of tangible goods. Step 102 marks the end of the purchase process.

With respect to FIG. 8, an illustrative method of using system 10 to enable a user to temporarily lock an account is described. Step 141 marks the beginning of the Account Locking Process. At step 142, the user makes purchases from various vendors using system 10. At the end of each day, at step 143, service provider computer 15 sends a notification to the account user, e.g., an e-mail, that lists all transactions processed during that day.

Alternatively, the user of the primary account may configure the period during which transactions are reported for each sub-account separately. Accordingly, some sub-accounts may provide a list of account transactions on a daily basis, while others are reported on a weekly or monthly basis. Further, the primary account user (or authorized sub-account user) may configure a given sub-account to report on a transaction-specific basis, or only for those transactions where the purchase amount exceeds some preset limit selected by the primary account holder. In this manner, the primary account holder is kept current on account activity, and can monitor the various sub-accounts for improper activity.

At step 144, the user receives the E-mail and reviews the transactions listed in the notification sent by service provider computer 15 (step 145). At step 146, if the user does not suspect any unauthorized transactions then, at step 163, the Account Lock Process terminates. If the user suspects that any of the transactions were unauthorized and that the account security may have been compromised (step 147), the user, at step 148, clicks on a link provided in the E-mail to lock the account.

When the user activates the link, at step 149, service provider computer 15 displays a login page. At step 150, the user logs in, and at step 151, service provider computer 15 validates the user login and displays a security question on the user device. At step 152, the user enters a security answer, which is validated by service provider computer 15 at step 153.

After validating the security answer, service provider computer 15 offers the user two options to disable the account (step 154): the user may either change the account password or temporarily lock the account. If the user chooses to change the account password (step 155), then service provider computer 15, at step 156, displays the "Change Password Screen". At Step 157, the user changes the password and at step 158, service provider computer 15 saves the changed password in the database.

If the user instead elects to lock the account, step 159 of FIG. 8, service provider computer 15, at step 160, requests the user to confirm locking of the account. If the user confirms at step 161, service provider computer 15 locks the account at step 162, thus preventing any further purchases from being made using that account. Subsequently, the user may login to the account to unlock the account.

Alternatively, locking and unlocking the account may be accomplished through a secured area of the user interface. The secured area may only be accessed by answering the security question and may contain information like E-mail address, password, security answer, etc.

Referring to FIG. 9, an illustrative method of using system 10 to transfer funds from one account to another is described. The sender's account is debited at the time the sender initiates the transfer and the receiver's account is credited when he or she receives the funds. In the interim period, the balance is retained in the service provider's "Funds Transfer Account".

Step 171 marks the beginning of the Funds Transfer Process. At step 172, the user, who wants to send funds to a user of another account, navigates to "Send Funds" screen provided by service provider computer 15. At step 173, service provider computer 15 displays the "Security Screen" for the user to enter the answer to the secret question. When the user enters the secret answer at step 174, service provider computer 15, at step 175, validates the secret answer and displays a screen on user device 12 or 13 that permits the user to identify the account to which funds are to be transferred ("receipent account") and the amount to be transferred. At step 176, the user specifies the recipient account by either entering the e-mail address associated to the user of that account or by entering the name or any other unique identifier for that account.

At step 177, service provider computer 15 records the transaction by crediting the service provider's "Service Charge Account" and the "Funds Transfer Account" and debiting the user's account by the amount to be transferred plus applicable service charges. Service provider computer 15 also sends an E-mail to the user who sent the money and an E-mail to the user of the recipient account. The E-mail sent to the holder of the recipient account preferably includes instructions and a link to complete the funds transfer.

Upon receiving the E-mail, the user of the recipient account follows the instructions to complete the funds transfer, e.g., by activating the link included in the E-mail and enters the appropriate Login ID and Password. Alternatively, the user of the recipient account may log into his or her account at service provider computer 15 and navigate to the "Receive Funds" screen at step 178.

At step 179, service provider computer 15 debits the "Funds Transfer Account", the account that was credited in step 177, credits the service provider's "Service Charge Account" and credits the recipient account by the amount that was transferred by the sender, less any service charges levied by the service provider. Finally, at step 180, service provider computer 15 sends an E-mail to the sender and receiver of the funds notifying the users that the funds were successfully transferred. Step 181 marks the end of funds transfer process.

Referring now to FIG. 10, an alternative method of transferring funds from one account to another is described. As compared to the embodiment of FIG. 9, where the sender's account is debited before the holder of the recipient account completes the funds transfer process, in the embodiment of FIG. 10 the sender's account is debited at about the same time the recipient account is credited for the funds transfer. Thus, the "Funds Transfer Account" of service provider computer 15 may be omitted.

Step 191 marks the beginning of this alternative Fund Transfer Process. At step 192, the user, who wants to send funds to a user of another account, navigates to the "Send Funds" screen. At step 193, service provider computer 15 displays the "Security Screen" for the user to enter the answer to the secret question. Once the user enters the secret answer, at step 194, service provider computer 15, at step 195, validates the secret answer and displays a screen on user device 12 or 13 for the user to identify the recipient account and the amount to be transferred. At step 196, the user selects a recipient account either entering the E-mail address associated to the user of that account or by entering the name or any other unique identifier for that account.

At step 197, service provider computer 15 sends an E-mail to the user who sent the money and an E-mail to the user of the recipient account. The E-mail sent to the holder of the recipient account may include instructions and a link to receive the funds.

The user of the recipient account follows the instructions included in the E-mail to complete the funds transfer process, e.g., by activating the link provided in the E-mail and entering the appropriate Login ID and Password. Alternatively, the user of the recipient account may log into his or her account at service provider computer 15 and navigate to the "Receive Funds" screen, at step 198.

At step 199, service provider computer 15 debits the sender's account with the amount that was transferred plus any service charge, credits the service provider's "Service Charge Account" and credits the recipient account by the amount that was transferred by the sender less any service charges levied by the service provider. Finally, at step 200, service provider computer 15 sends an E-mail to the sender and receiver of the funds notifying the users that the funds were successfully transferred. Step 201 marks the end of funds transfer process.

The funds transfer feature of the present reduces the risk of fraud that often exists for auction buyers, especially where the seller delivers faulty goods or even fails to deliver the any goods. In a system configured according to the methods of the present invention, the buyer may "Lock" his or her account immediately upon noticing an irregularity in goods purchased, thus preventing the payment. This would not be the case if the user uses a credit card in which case the user needs to notify the credit card company to stop payment, which often is cumbersome.

In addition, in the case where the buyer pays the seller for the goods before the seller makes delivery and the seller provides irregular goods or no goods, the buyer may contact the service provider and request that the purchased be reversed. In this case, the service provider will re-credit the buyer's user account, and debit the seller's account, or if the seller has already been paid, deduct the disputed amount from settlement of a subsequent transaction conducted by the seller through the service provider.

The foregoing embodiments are merely illustrative of the principles of the present invention and various modifications may be made by those skilled in the art without departing from the scope and spirit of the invention.

What is claimed is:

1. A system for facilitating electronic commerce among users, a service provider and vendors, wherein each user has established a primary account with the service provider, the system comprising:
    a plurality of vendor computers, each vendor computer programmed to provide a website at which a user at a user device may purchase goods or services;
    a service provider computer at which the user has established a primary account, the service provider computer programmed to permit the user to establish a sub-account under the primary account, the primary account and sub-account having a prepaid value in the form of electronic tokens
    wherein the user may specify a subset of the plurality of vendor computers that are the only vendor computers from which purchases may be made using the sub-account;
    wherein the service provider computer is programmed to permit the user to authorize the sub-account to independently add funds; and
    a communications network enabling the user device to communicate with the plurality of vendor computers;
    wherein the service provider computer is programmed to permit the user to authorize the sub-account to establish a further sub-account subordinate to the sub-account.

2. The system of claim 1 wherein
the service provider computer is programmed to permit the user of the primary account to transfer electronic tokens to the sub-account from the primary account.

3. The system of claim 1 wherein
the service provider computer is programmed to permit the user to specify a plurality of authorized users for the sub-account.

4. The system of claim 1 wherein
the service provider computer is programmed to permit the user to specify a spending limit for the sub-account per transaction, per day, per week, and per month.

5. The system of claim 1 wherein
the service provider computer is programmed to permit a user of the sub-account to modify secured information of the sub-account.

6. The system of claim 1 wherein
the service provider computer is programmed to permit the user to configure the sub-account to automatically add funds to the sub-account during a transaction if a balance of the sub-account falls below a minimum balance, wherein the balance of the sub-account is automatically brought up to a predetermined amount associated with the sub-account.

7. The system of claim 1 wherein
the service provider computer is programmed to send a notification to the user of the primary account on a periodic basis, wherein the notification lists all transactions of the sub-account.

8. The system, of claim 1 wherein
the service provider computer is programmed to send a notification to the user of the primary account when predetermined types of transactions are made in the primary account or in the sub-account.

9. The system of claim 1 wherein
the service provider computer is programmed to send a notification to the user of the primary account, the notification including a link that the user may activate to lock the sub-account.

* * * * *